US012381302B2

(12) United States Patent
Jia et al.

(10) Patent No.: US 12,381,302 B2
(45) Date of Patent: Aug. 5, 2025

(54) BALUN STRUCTURE AND ELECTRONIC DEVICE

(71) Applicants: Beijing BOE Sensor Technology Co., Ltd., Beijing (CN); BOE Technology Group Co., Ltd., Beijing (CN)

(72) Inventors: Haocheng Jia, Beijing (CN); Yi Ding, Beijing (CN); Hao Guo, Beijing (CN); Yan Lu, Beijing (CN); Xiaobo Wang, Beijing (CN); Weisi Zhou, Beijing (CN); Wenxue Ma, Beijing (CN); Jing Wang, Beijing (CN); Chuncheng Che, Beijing (CN)

(73) Assignees: BEIJING BOE SENSOR TECHNOLOGY CO. , LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/017,674

(22) PCT Filed: Feb. 28, 2022

(86) PCT No.: PCT/CN2022/078371
§ 371 (c)(1),
(2) Date: Jan. 24, 2023

(87) PCT Pub. No.: WO2023/159587
PCT Pub. Date: Aug. 31, 2023

(65) Prior Publication Data

US 2024/0304975 A1 Sep. 12, 2024

(51) Int. Cl.
*H01P 5/10* (2006.01)
*H01Q 1/48* (2006.01)
(Continued)

(52) U.S. Cl.
CPC ............ *H01P 5/1007* (2013.01); *H01Q 1/48* (2013.01); *H01Q 9/0414* (2013.01); *H01Q 9/26* (2013.01)

(58) Field of Classification Search
CPC ...... H01P 5/1007; H01Q 1/48; H01Q 9/0414; H01Q 9/26
See application file for complete search history.

(56) References Cited

U.S. PATENT DOCUMENTS 4,882,553 A 11/1989 Davies et al.
6,351,192 B1 2/2002 Sheen
(Continued)

FOREIGN PATENT DOCUMENTS

CN 106450630 A 2/2017
CN 109346809 A 2/2019
(Continued)

OTHER PUBLICATIONS

Tzyh-Ghuang MA et al., "A Compact Multilayered Magic-T in Microstrip Form and Its Application to Microwave Sampler", 2008 IEEE MTT-S International Microwave Symposium Digest, Sep. 26, 2008, p. 887, right column, paragraph 2—p. 889, right column, paragraph 3, figures 1-2 and 5, 4pp.
(Continued)

*Primary Examiner* — Dieu Hien T Duong
(74) *Attorney, Agent, or Firm* — XSENSUS LLP

(57) ABSTRACT

Provided is a balun structure, including: a first dielectric layer, a second dielectric layer, a ground electrode, an unbalance electrode, and a balance electrode. The first dielectric layer, the ground electrode, the second dielectric layer are successively stacked, and the ground electrode has a coupling hole therein. The coupling hole extends from a surface facing the first dielectric layer to a surface facing the second dielectric layer. The unbalance electrode is disposed
(Continued)

on a first side of the first dielectric layer, wherein the first side of the first dielectric layer is a side, distal from the ground electrode, of the first dielectric layer. The balance electrode is disposed on a first side of the second dielectric layer, wherein the first side of the second dielectric layer is a side, distal from the ground electrode, of the second dielectric layer.

18 Claims, 7 Drawing Sheets

(51) Int. Cl.
*H01Q 9/04* (2006.01)
*H01Q 9/26* (2006.01)

(56) References Cited

U.S. PATENT DOCUMENTS

| | | | | |
|---|---|---|---|---|
| 8,022,887 | B1 * | 9/2011 | Zarnaghi | H01Q 1/38 343/846 |
| 2002/0153988 | A1 | 10/2002 | Yazaki et al. | |
| 2006/0208825 | A1 | 9/2006 | Takahashi | |
| 2009/0140823 | A1 * | 6/2009 | Lee | H01P 11/00 333/26 |
| 2018/0166764 | A1 | 6/2018 | Poddar et al. | |

FOREIGN PATENT DOCUMENTS

| | | | |
|---|---|---|---|
| CN | 112134016 | A | 12/2020 |
| GB | 2 057 196 | A | 3/1981 |
| WO | 2015/094056 | A1 | 6/2015 |

OTHER PUBLICATIONS

Shuxiong Chen, "Research on modeling optimization and design method of Marchand balun", Chinese Master's Theses Full-text Database (Electronic Journal), May 1, 2016, Section 5.5.

Li Yang et al., "Wideband Balanced-to-Unbalanced Bandpass Filters Synthetically Designed With Chebyshev Filtering Response", IEEE Transactions on Microwave Theory and Techniques, vol. 66 No. 10, Aug. 14, 2018, p. 4529, left column, paragraph 2—p. 4532, left column, paragraph 2, figures 1-2 and 6, 12pp.

Marchand, "Research on modeling optimization and design method of Marchand balun", Chinese Master's Theses Full-text Database (Electronic Journal), May 1, 2016, Section 5.5.

Lin-Ping Feng, "Wideband Filtering Balun on a Novel Hybrid Multimode Resonator With the Functionality of Vertical Transition", IEEE Transactions on Components, Packaging and Manufacturing Technology, vol. 7 No. 8, Feb. 20, 2017, p. 1328, left column, paragraph 1—right column, paragraph 1, figure 9, 7pp.

* cited by examiner

BALUN STRUCTURE AND ELECTRONIC DEVICE

CROSS-REFERENCE TO RELATED APPLICATION

The present disclosure is a U.S. national stage of international application No. PCT/CN2022/078371, filed on Feb. 28, 2022, the content of which is herein incorporated by reference in its entirety.

TECHNICAL FIELD

The present disclosure relates to the field of microwave technologies, and in particular, relates to a balun structure and an electronic device.

BACKGROUND OF THE INVENTION

A balun, which is also referred to as a balanced to unbalanced converter, has a function of converting an unbalanced signal into a balanced signal.

Types of the balun include a transformer balun, a hybrid coupler balun, and the like. However, the above types of balun structures are large in size and have difficulties in meeting miniaturization requirements.

SUMMARY OF THE INVENTION

Embodiments of the present disclosure provide a balun structure and an electronic device, which are capable of implementing the miniaturization of the balun structure. The technical solutions are as follows.

In one aspect, some embodiments of the present disclosure provide a balun structure. The balun structure includes: a first dielectric layer, a second dielectric layer, a ground electrode, an unbalance electrode, and a balance electrode; wherein

- the first dielectric layer, the ground electrode, the second dielectric layer are successively stacked, and the ground electrode has a coupling hole therein, the coupling hole extending from a surface facing the first dielectric layer to a surface facing the second dielectric layer;
- the unbalance electrode is disposed on a first side of the first dielectric layer, wherein the first side of the first dielectric layer is a side, distal from the ground electrode, of the first dielectric layer; the balance electrode is disposed on a first side of the second dielectric layer, wherein the first side of the second dielectric layer is a side, distal from the ground electrode, of the second dielectric layer; and in a direction perpendicular to the first dielectric layer, the unbalance electrode and the balance electrode are both at least partially overlapped with the coupling hole.

In some embodiments, the ground structure includes a first side edge and a second side edge that are opposite to each other;

- the unbalance electrode is disposed between the first side edge of the ground electrode and an edge, proximal to the second side edge, of the coupling hole, and the balance electrode is disposed between the second side edge of the ground electrode and an edge, proximal to the first side edge, of the coupling hole; and
- in the direction perpendicular to the first dielectric layer, a side, proximal to the coupling hole, of the unbalance hole, a side, proximal to the coupling hole, of the balance electrode, and the coupling hole are at least partially overlapped.

In some embodiments, the coupling hole is a rectangular hole, an H-shaped hole, or an elliptical hole.

In some embodiments, the unbalance electrode includes: a transmission portion, an open circuit portion, and a connection portion; wherein

- the transmission portion is provided with a first connection terminal distal from the coupling hole and a second connection terminal proximal to the coupling hole, the open circuit portion is parallel to the transmission portion and is provided with an open circuit terminal distal from the coupling hole and a third connection terminal proximal to the coupling hole, and the connection portion is connected to the second connection terminal and the third connection terminal; and
- in the direction perpendicular to the first dielectric layer, the connection portion is at least partially overlapped with the coupling hole.

In some embodiments, the connection portion is overlapped with a center of the coupling hole; and

- a total length of the open circuit portion and the connection portion that are disposed between the open circuit terminal and the center of the coupling hole is ¼ wavelength.

In some embodiments, the balance electrode includes: an antenna structure, two impedance matching structures, and two transmission electrodes;

- wherein the antenna structure is provided with two arms, wherein in the direction perpendicular to the first dielectric layer, wherein one end of each of the two arms is overlapped with the coupling hole, and the other ends of the two arms are respectively disposed on two sides of the coupling hole; the two impedance matching structures are respectively disposed on the two sides of the coupling hole and are respectively connected to the two arms of the antenna structure; and the two transmission electrodes are respectively disposed on the two sides of the coupling hole and are respectively connected to the two impedance matching structures; and extension directions of the impedance matching structure and the transmission electrode are parallel to a length direction of the coupling hole.

In some embodiments, a width of each of the arms of the antenna structure progressively increases from one end of the arm to the other end of the arm, or remains constant from one end of the arm to the other end of the arm, or increases and then decreases from one end of the arm to the other end of the arm.

In some embodiments, each of the arms of the antenna structure has a via hole therein, the via hole extending from the surface facing the second dielectric layer to a surface facing away the second dielectric layer.

In some embodiments, each of the arms of the antenna structure is fold-line shaped.

In some embodiments, the balance electrode further includes: a balance branch,

- wherein the balance branch is disposed between the two impedance matching structures and is connected to the two arms of the antenna structure.

In some embodiments, the two arms of the antenna structure are separated from each other; or the two arms of the antenna structure are connected to each other.

In some embodiments, the balun further includes: a third dielectric layer and a fourth dielectric layer;

wherein the third dielectric layer is disposed between the second dielectric layer and the fourth dielectric layer, and the balance electrode is disposed within the third dielectric layer.

In some embodiments, the balance electrode includes two units, wherein each of the two units includes one of the arms, one of the impedance matching structures, and one of the transmission electrodes that are successively connected:

wherein the two units of the balance electrode are within a same plane; or the two units of the balance electrode are within different planes.

In some embodiments, the two units of the balance electrode are respectively in contact with surfaces of the second dielectric layer and the fourth dielectric layer.

In another aspect, some embodiments of the present disclosure provide an electronic device. The device includes a planar microwave device and a balun structure connected to the planar microwave device, wherein the balun structure is the balun structure as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the enclosed drawings, to clearly present the objects, technical solutions, and advantages of the present disclosure.

It should be noted that, unless otherwise defined, technical or scientific terms used in the embodiments of the present disclosure shall have ordinary meanings understandable by persons of ordinary skill in the art to which the disclosure belongs. The terms "first," "second," "third," and the like used in the embodiments and claims of the present disclosure are not intended to indicate any order, quantity, or importance, but are merely used to distinguish the different components. Similarly, the term "one," and the like are not intended to indicate a quantitative limitation but are merely used to indicate an existence of at least one. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

Figure 1:
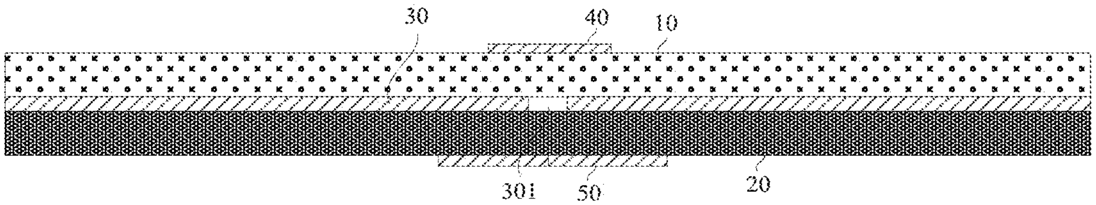
FIG. 1 is a schematic structural diagram of a balun structure according to some embodiments of the present disclosure.

FIG. 1 is a schematic structural diagram of a balun structure according to some embodiments of the present disclosure. Referring to FIG. 1, the balun structure includes: a first dielectric layer 10, a second dielectric layer 20, a ground electrode 30, an unbalance electrode 40, and a balance electrode 50.

As illustrated in FIG. 1, the first dielectric layer 10, the ground electrode 30, and the second dielectric layer 20 are successively stacked. The ground electrode 30 has a coupling hole 301 therein. The coupling hole 301 extends form a surface facing the first dielectric layer 10 to a surface facing the second dielectric layer 20.

The unbalance electrode 40 is disposed on a first side of the first dielectric layer 10. The first side of the first dielectric layer 10 is a side, distal from the ground electrode 30, of the first dielectric layer 10. The balance electrode 50 is disposed on a first side of the second dielectric layer 20. The first side of the second dielectric layer 20 is a side, distal from the ground electrode 30, of the second dielectric layer 20. In a direction away from the first dielectric layer 10, the unbalance electrode 40 and the balance electrode 50 are both at least partially overlapped with the coupling hole 301.

In the embodiments of the present disclosure, the unbalance electrode is arranged on the first side of the first dielectric layer, the balance electrode is arranged on the first side of the second dielectric layer, and the ground electrode provided with the coupling hole is arranged between the two dielectric layers. Because the unbalance electrode and the balance electrode are both at least partially overlapped with the coupling hole in the direction perpendicular to the first dielectric layer, a signal of one of the unbalance electrode and the balance electrode is coupled to another via the coupling hole to implement a balanced-unbalanced conversion. That is, an unbalanced signal input from the unbalance electrode is coupled to the balance electrode, and a balanced signal is generated and output; or a balanced signal input from the balance electrode is coupled to the unbalance electrode, and an unbalanced signal is generated and output. The balun structure is composed of the first dielectric layer, the second dielectric layer, the ground electrode, the unbalance electrode, and the balance electrode, of which the structure is compact and featured with miniaturization.

The balun structure according to some embodiments of the present disclosure is applicable to differential inputs of signals of a planar microwave device to implement a balanced to unbalanced conversion of such devices. The balun structure, in addition to miniaturization, is capable of ensuring a signal transmission bandwidth, that is, has a broadband characteristic.

The planar microwave device is a differential antenna or other microwave devices, such as a liquid crystal phase shifter. A differential signal is supplied to the liquid crystal phase shifter by the balun structure.

In addition, in the balun structure according to some embodiments of the present disclosure, one of the unbalance electrode and the balance electrode is used as an input of a signal and the other is used as an output of a signal. The unbalance electrode and the balance electrode are disposed in different layers, such that the balun structure according to the present disclosure implements layer exchanging of the input signal and the output signal and is applied in a scenario of layer exchanging of an input signal transmission line and an output signal transmission line, such as a differential feed of a double-layered board interlayer device, especially a differential feed within a box-glass structure. The balance electrode and the unbalance electrode of the balun structure according to the present disclosure are respectively connected to the double-layered board interlayer device or two transmission lines disposed in different layers in the box-glass structure.

In some embodiments of the present disclosure, the first dielectric layer 10 and the second dielectric layer 20 are formed using a single-layer structure or a multi-layer composite structure. The single-layer structure and the multi-layer composite structure are exemplified hereinafter, and the first dielectric layer 10 and the second dielectric layer 20 are both a single-layer structure or a multi-layer composite structure.

Exemplarily, the single-layer structure includes, but is not limited to, a printed circuit board (PCB), a glass board, a flexible resin substrate, a foam board, and the like.

Exemplarily, the multi-layer composite structure is made of at least two layers of the single-layer structures, such as a PCB and foam board composite structure.

In some embodiments of the present disclosure, the ground electrode 30, the unbalance electrode 40, and the balance electrode 50 are metal electrodes or alloy electrodes, such as copper electrodes, aluminum electrodes, molybdenum electrodes, and electrodes formed by at least two of the above alloys. Any two of the ground electrode 30, the unbalance electrode 40, and the balance electrode 50 are made of a same material or not.

In some embodiments of the present disclosure, the first dielectric layer 10 and the second dielectric layer 20 are planar structures, outlines of which are regular shapes, such as rectangles, circles or the like, or irregular shapes, which are not limited herein.

In some embodiments of the present disclosure, the ground electrode 30, the unbalance electrode 40, and the balance electrode 50 are planar structures.

The ground electrode 30, the unbalance electrode 40, and the balance electrode 50 in some embodiments of the present disclosure are described hereinafter in conjunction with the accompanying drawings.

Figure 2:
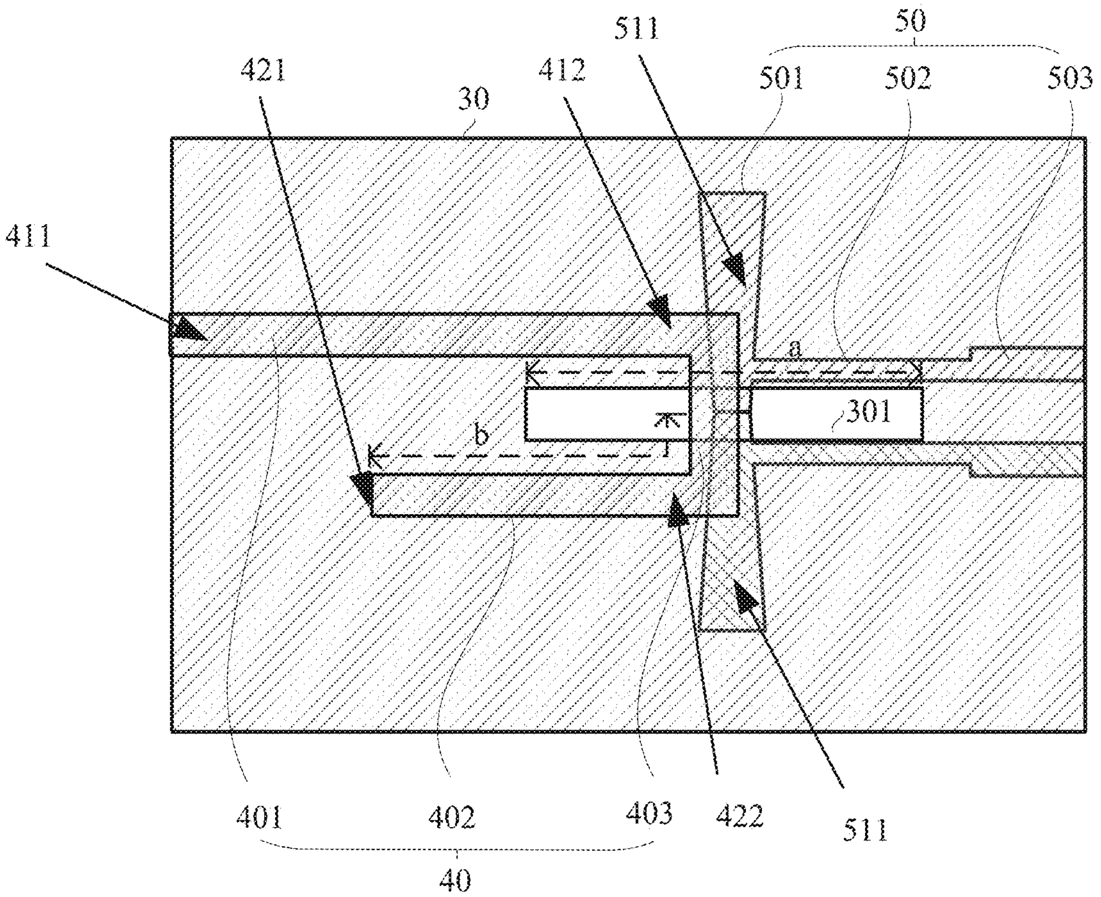
FIG. 2 is a schematic structural diagram of another balun structure according to some embodiments of the present disclosure.

FIG. 2 is a positional relationship diagram of the ground electrode 30, the unbalance electrode 40, and the balance electrode 50 in FIG. 1. For ease of observation, the first dielectric layer 10 and the second dielectric layer 20 are not illustrated in FIG. 2; and the other positional relationships of the ground electrode 30, the unbalance electrode 40, and the balance electrode 50 are likewise illustrated in the subsequent accompanying drawings.

Referring to FIG. 2, the ground electrode 30 includes a first side edge and a second side edge that are opposite to each other. For example, left and right side edges in FIG. 2 are respectively the first side edge and the second side edge.

The unbalance electrode 40 is disposed between the first side edge of the ground electrode 30 and an edge, proximal to the second side edge, of the coupling hole 301. The electrode 50 is disposed between the second side edge of the ground electrode 30 and an edge, proximal to the first side edge, of the coupling hole 301.

In the direction perpendicular to the first dielectric layer 10, a side, proximal to the coupling hole 301, of the unbalance electrode 40, a side, proximal to the coupling hole 301, of the balance electrode 50, and the coupling hole 301 are both at least partially overlapped and form a certain overlap region.

In the above structure, from the coupling hole 301, the unbalance electrode 40 and the balance electrode 50 respectively face towards opposite directions, such that coupling is successfully implemented. In addition, in some embodiments of the present disclosure, a signal between the unbalance electrode 40 and the balance electrode 50 is coupled and transmitted via the coupling hole 301. Therefore, in the case that the unbalance electrode 40, the balance electrode 50, and the coupling hole 301 are overlapped simultaneously, a better coupling effect of the signal is achieved, which is conducive to transmission of the signal in the balun structure.

Further, the unbalance electrode 40 and the balance electrode 50 are both overlapped with a center of the coupling hole 301 to achieve an optimal coupling effect.

In some embodiments of the present disclosure, according to a Bethe small hole coupling theory, the coupling hole 301 is functionally equivalent to a dipole/magnetic dipole, and the shape of the coupling hole 301 is not limited. For example, as illustrated in FIG. 2, the coupling hole 301 is a rectangular hole, and a length a of the rectangular hole is ½ wavelength (a half thereof is ¼ wavelength), or a difference between the length a and ½ wavelength is small.

In some embodiments of the present disclosure, a length direction of the coupling hole 301 is consistent with a length direction of the ground electrode. For example, a length direction of a rectangular electrode in FIG. 2 is an extension direction of a long side of the rectangle. In this case, the length direction of the coupling hole is consistent with the extension direction of the long side of the ground electrode. The ground electrode may also be other shapes, which is not limited herein.

Figure 3:
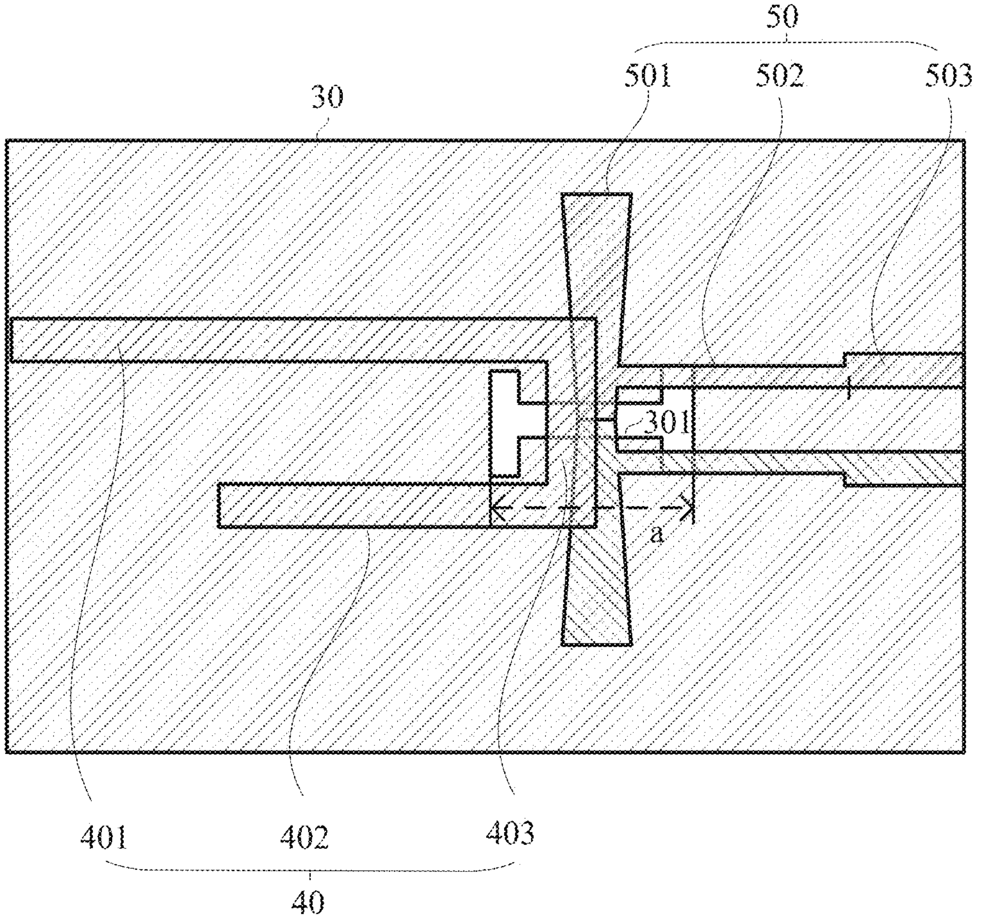
FIG. 3 is a schematic structural diagram of still another balun structure according to some embodiments of the present disclosure.

As illustrated in FIG. 3, the coupling hole 301 is an H-shaped hole, a length of the H-shaped hole is less than ½ wavelength, such that the miniaturization of the ground electrode is implemented, and thus the miniaturization of the entire balun structure is implemented. Strip-shaped structures of two ends of the H-shaped hole are capable of ensuring a perimeter and an area of the H-shaped hole in the case that the length is reduced, such that an equivalent electrical length of the coupling hole 301 is ½ wavelength. The H-shaped hole includes the strip-shaped structures vertically extending at the two ends and a strip-shaped structure laterally extending at the middle. The length of the H-shaped structure is a length of the strip-shaped structure laterally extending at the middle.

The coupling holes in FIG. 2 and FIG. 3 are only two examples, which are not intended to limit the shape of the coupling hole. For example, the coupling hole is an elliptical hole or a hole in other shapes, as long as it is ensured that the coupling hole is capable of generating an appropriate electromagnetic field mode and implementing the signal coupling.

In some embodiments of the present disclosure, the unbalance electrode 40 and the balance electrode 50 extend along the length direction of the ground electrode 30. For example, an outline of the ground electrode 30 is a rectangle, and the length direction of the ground electrode is the extension direction of the long side of the ground electrode, that is, a horizontal direction in FIG. 2. Structures of the unbalance electrode 40 and the balance electrode 50 are described hereinafter in conjunction with the accompany drawings.

As illustrated in FIG. 2, the unbalance electrode 40 includes: a transmission portion 401, an open circuit portion 402, and a connection portion 403.

The transmission portion 401 includes a first connection terminal 411 distal from the coupling hole 301 and a second connection terminal 412 proximal to the coupling hole 301. The open circuit portion 402 is parallel to the transmission portion 401. The open circuit portion 402 includes an open circuit terminal 421 distal from the coupling hole 301 and a third connection terminal 422 proximal to the coupling hole 301. The connection portion 403 is connected to the second connection terminal 412 and the third connection terminal 422.

The term "distal from," indicates that the first connection terminal 411 is further away from the coupling hole 301 than the second connection terminal 412 is from the coupling hole 301, and the term "proximal to," indicates that the second connection terminal 412 is closer to the coupling hole 301 than the first connection terminal 411 is to the coupling hole 301.

In the direction perpendicular to the first dielectric layer 10, the connection portion 403 is overlapped with the coupling hole 301.

In some embodiments of the present disclosure, the unbalance electrode 40 is connected to a device outside the balun structure by the transmission portion as an input-output terminal to implement the input and output of the signal, and is overlapped with the coupling hole by the transmission portion to implement the coupling of the signal.

In some embodiments of the present disclosure, the transmission portion 401, the connection portion 402, and the open circuit portion 403 of the unbalance electrode 40 are strip-shaped, such as rectangular strips illustrated in FIG. 2.

As illustrated in FIG. 2, a length of the transmission portion 401 is greater than a length of the open circuit portion 403.

Exemplarily, the connection portion 403 is overlapped with the center of the coupling hole 301; and a total length of the open circuit portion 402 and the connection portion 403 that are disposed between the open circuit terminal 421 and the center of the coupling hole 401 is ¼ wavelength or approaches ¼ wavelength. That is, the entire unbalance electrode 40 is considered as a signal transmission line, and a length of the portion of the signal transmission line between the open circuit terminal 421 and the center of the coupling hole 301 is ¼ wavelength. Through simulation tests, by designing a distance between the open circuit terminal 421 and the center of the coupling hole 301 based on the above length, a maximum coupling efficiency is ensured, and a transmission bandwidth is improved.

As illustrated in FIG. 2, the transmission portion 401 and the open circuit portion 403 are disposed on the two sides of the coupling hole 301, and extension directions of the transmission portion 401 and the open circuit portion 403 are both parallel to the length direction of the coupling hole 301. The connection portion 402 connecting the transmission portion 401 to the open circuit portion 403 is perpendicular to the length direction of the coupling hole 301.

The above limitation of the parallel and perpendicular directions is only an example, which is not limited herein. For example, the extension directions of the transmission portion 401 and the open circuit portion 403 are approximately parallel to the length direction of the coupling hole 301, and the connection portion 402 connected the transmission portion 401 to the open circuit portion 403 is approximately perpendicular to the length direction of the coupling hole 301. Similarly, descriptions hereinafter of parallel and perpendicular directions are all exemplary.

As illustrated in FIG. 2, the balance electrode 50 includes: an antenna structure 501, two impedance matching structures 502, and two transmission electrodes 503.

The antenna structure 501 includes two arms 511. In the direction perpendicular to the first dielectric layer 10, one end of each of the two arms 511 is overlapped with the coupling hole 301, and the other ends of the two arms 511 are respectively disposed on the two sides of the coupling hole 301; the two impedance matching structures 502 are respectively disposed on the two sides of the coupling hole 301 and are respectively connected to the two arms 511 of the antenna structure 501; and the two transmission electrodes 503 are respectively disposed on the two sides of the coupling hole 301 and are respectively connected to the two impedance matching structures 502. Extension directions of the impedance latching structure 502 and the transmission electrode 503 are parallel to the length direction of the coupling hole 301.

A junction of the impedance matching structure 502 and the arm 511 is proximal to one end of the arm 511. The arm 511 is provided with an open circuit point, and a path length from the open circuit point to the coupling hole 301 is about ¼ wavelength.

In some embodiments of the present disclosure, the balanced antenna design concept is utilized to implement the balance electrode and the miniaturization of the balun structure. The transmission and reception of the signal are implemented by the antenna structure, the impedance matching between the antenna structure and the transmission electrode is implemented by the impedance structure, and the input and output of the signal are implemented by the two transmission electrodes.

The balun structure according to some embodiments of the present disclosure reversely uses a feed principle of the balance antenna when converting the unbalanced signal into the balanced signal, and uses the unbalance electrode to couple the signal to the balance electrode to complete a feed to the balance electrode, such that the balance electrode obtains a pair of differential signals. Powers of the above pair of differential signals are equal and phases thereof are different by 180°.

In some exemplary embodiments of the present disclosure, the antenna structure 501 is a dipole antenna. A center position of the antenna structure 501 is disposed on or close to a centerline of the coupling hole 301.

In some other exemplary embodiments of the present disclosure, the antenna structure 501 is a bowtie antenna, an inverted F antenna, or other types of antennas, as long as the feed of the balanced signal is achieved.

As illustrated in FIG. 2, extension directions of the two arms 511 of the antenna structure 501 are both perpendicular to the length direction of the coupling hole 301.

In some embodiments of the present disclosure, the two arms of the antenna structure 501 are both strip-shaped. A width of each of the arms 511 of the antenna structure 501 remains constant from one end of the arm 511 to the other end of the arm 511.

As illustrated in FIG. 2, the antenna structure 501 is a gradient dipole antenna. A width of each of the arms 511 of the antenna structure progressively increases from one end of the arm 511 to the other end of the arm 511, such that the entire balun structure has better beam and bandwidth performance.

For example, as illustrated in FIG. 2, the arm 511 of the antenna structure 501 is trapezoidal, and the term "trapezoidal" herein involves an isosceles trapezoid, a right-angle trapezoid, or other types of trapezoids.

In other exemplary embodiments, from one end of the arm 511 to the other end of the arm 511, a width of the arm of the antenna structure 501 increases first and then decreases.

In some embodiments of the present disclosure, each of the arms 511 of the antenna structure 501 is fold-line shaped. By the fold-line design, in the case that an equivalent current length is ensured, the arm is prevented from extending too long in one direction, such that the miniaturization of the entire balun structure is eased. This is more beneficial to application scenarios where the balun structures require to be miniaturized, such as an array antenna.

Exemplarily, the fold-line shaped arm includes a bent portion or a plurality of bent portions, and a bent angle of each of the bent portions is not limited.

For example, the fold-line shaped arm includes a bent portion, and the angle of the bent portion is 90°. That is, the arm 511 is L-shaped.

Figure 4:
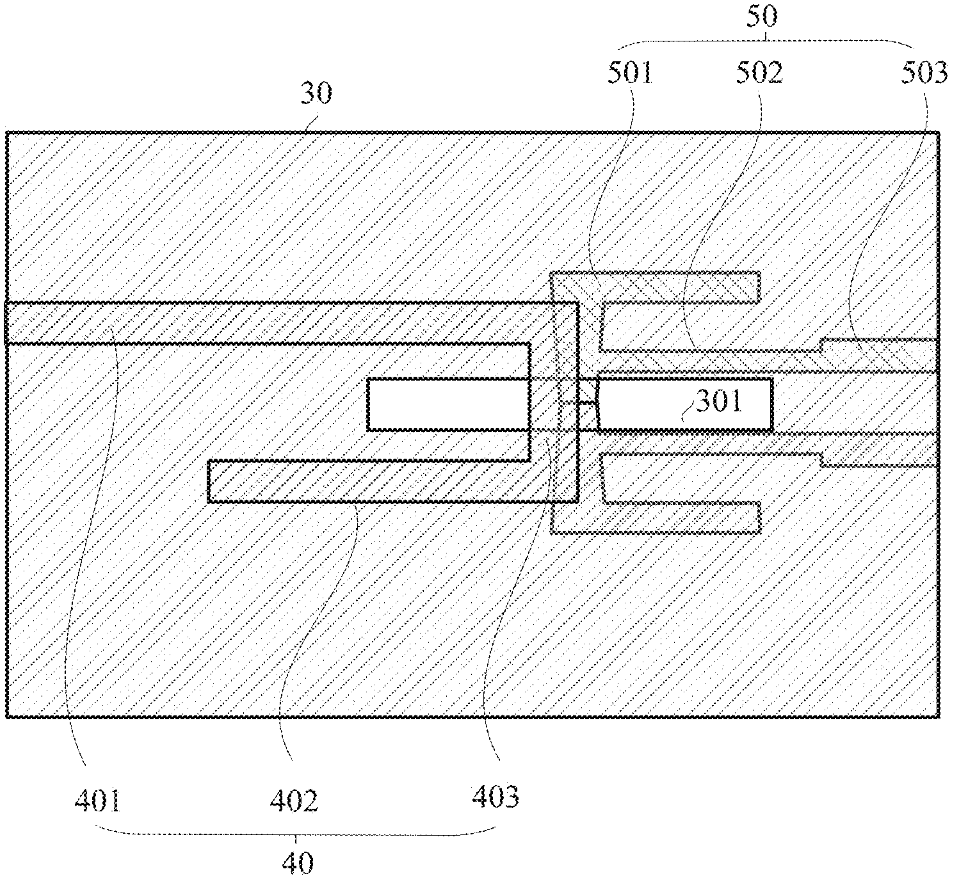
FIG. 4 is a schematic structural diagram of still another balun structure according to some embodiments of the present disclosure.

FIG. 4 is a schematic structural diagram of still another balun structure according to some embodiments of the present disclosure. Referring to FIG. 4, the two arms 511 of the antenna structure 501 are both L-shaped. The L-shaped arm includes two portions perpendicular to each other. An extension direction of one of the two portions is parallel to the length direction of the coupling hole 301, and an extension direction of the other of the two portions is perpendicular to the length direction of the coupling hole 301. The L-shaped arm is capable of greatly reducing an extension length of the arm in one direction to ensure the miniaturization of the balun structure.

Outline shapes of the arms illustrated in FIG. 2 and FIG. 4 are only examples. For example, the outline of the arm 511 is triangular, such as the shape of an isosceles triangle, a right triangle, or other triangles.

Figure 5:
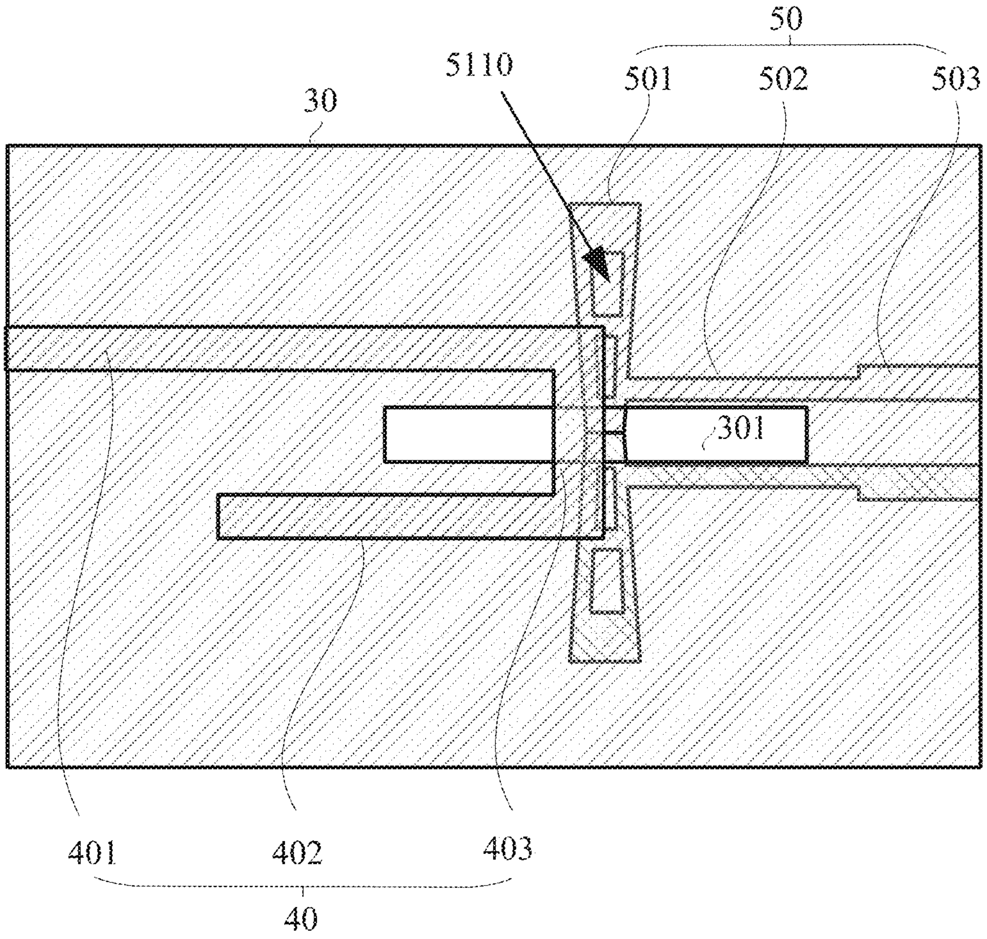
FIG. 5 is a schematic structural diagram of still another balun structure according to some embodiments of the present disclosure.

FIG. 5 is a schematic structural diagram of still another balun structure according to some embodiments of the present disclosure. Referring to FIG. 5, a difference between the antenna structure 501 illustrated in FIG. 5 and the antenna structure 501 illustrated in FIG. 2 is that each of the arms 511 of the antenna structure 501 illustrated in FIG. 5 has a via hole 5110 therein, wherein the via hole 5110 extends from a surface facing the second dielectric layer 20 to a surface facing away the second dielectric layer 20. An equivalent current path length is increased under the same arm length by opening holes in the arms, and the same resonant frequency is implemented in a smaller size. This reduces a physical size of the antenna structure and achieves a better effect on the miniaturization of the balun structure, and is more beneficial to the application scenarios where the balun structure requires to be miniaturized, such as the array antennas.

In some embodiments of the present disclosure, each of the arms 511 has one or more via holes therein, wherein the shapes, number, and area of the via holes opened in the two arms are the same. That is, structures of the two arms 511 are the same and the two arms 511 are arranged symmetrically. For example, each of the arms in FIG. 5 has two via holes therein.

Exemplarily, the shape of the via hole 5110 in the arm 511 and the outline shape of the arm 511 are the same. For example, the outline of the arm 511 is isosceles trapezoidal and the via hole 5110 is also isosceles trapezoidal.

In other exemplary embodiments, the shape of the via hole 5110 in the arm 511 is different from the outline shape of the arm 511.

As illustrated in FIG. 5, the via hole 5110 is provided in the strip-shaped arm. The via hole 5110 is provided in the arm of any other shape, such as the L-shaped arm in FIG. 4.

In the unbalance electrode 50 illustrated in FIG. 2 to FIG. 5, the two impedance matching structures 502 are respectively disposed on the two sides of the coupling hole 301, and the two transmission electrodes 503 are respectively disposed on the two sides of the coupling hole 301.

The impedance matching structure 502 and the two transmission electrodes 503 are strip-shaped, such as a long rectangle illustrated in FIG. 5.

Exemplarily, a length of the impedance matching structure 502 is ¼ wavelength. An impedance value of the impedance matching structure 502 is a matching impedance of the transmission electrode 503 and the antenna structure 501, such that impedance matching between the antenna structure 501 and the transmission electrode 503 is implemented.

Exemplarily, a width of the transmission electrode 503 is greater than a width of the impedance matching structure 502, thereby facilitating connection of the transmission electrode 501 to a device outside the balun structure.

In some embodiments of the present disclosure, the transmission portion in the unbalance electrode 40 and the two transmission electrodes 503 in the balance electrode 50 extend to an edge of the balun structure, thereby facilitating connection to a device outside the balun structure.

In the antenna structure 501 illustrated in FIG. 2 to FIG. 5, the two arms 511 of the antenna structure 501 are connected. The two arms 511 are of an integrated structure, or two separate structures but are in contact.

Figure 6:
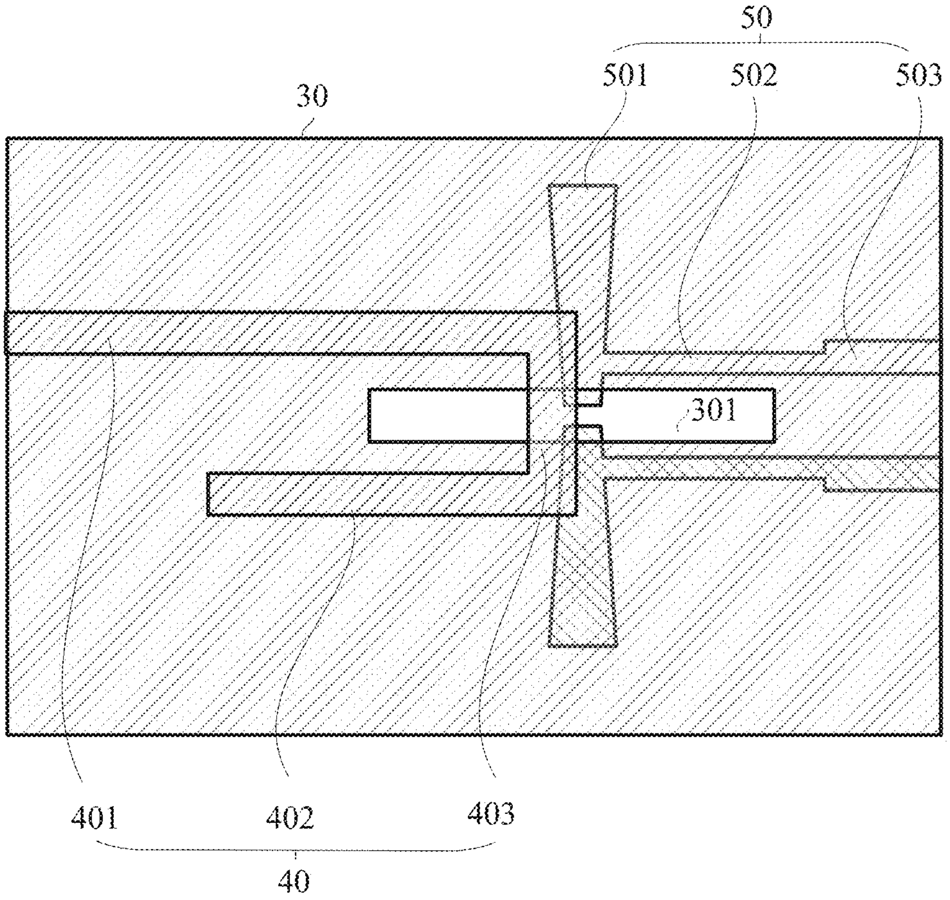
FIG. 6 is a schematic structural diagram of still another balun structure according to some embodiments of the present disclosure.

FIG. 6 is a schematic structural diagram of still another balun structure according to some embodiments of the present disclosure. Referring to FIG. 6, the two arms 511 of the antenna structure 501 are separated from each other. In this case, the two arms are isolated better and are better capable of suppressing the common mode, such that a differential mode effect of the feeds of the two arms 511 is achieved, and thus a differential effect of the balance electrode is finally achieved.

In the case that the two arms 511 of the antenna structure 501 are separated from each other, the balance electrode 50 includes two units. Each of the units includes one of the arms 511, one of the impedance matching structures 502, and one of the transmission electrodes 503 that are successively connected.

Figure 7:
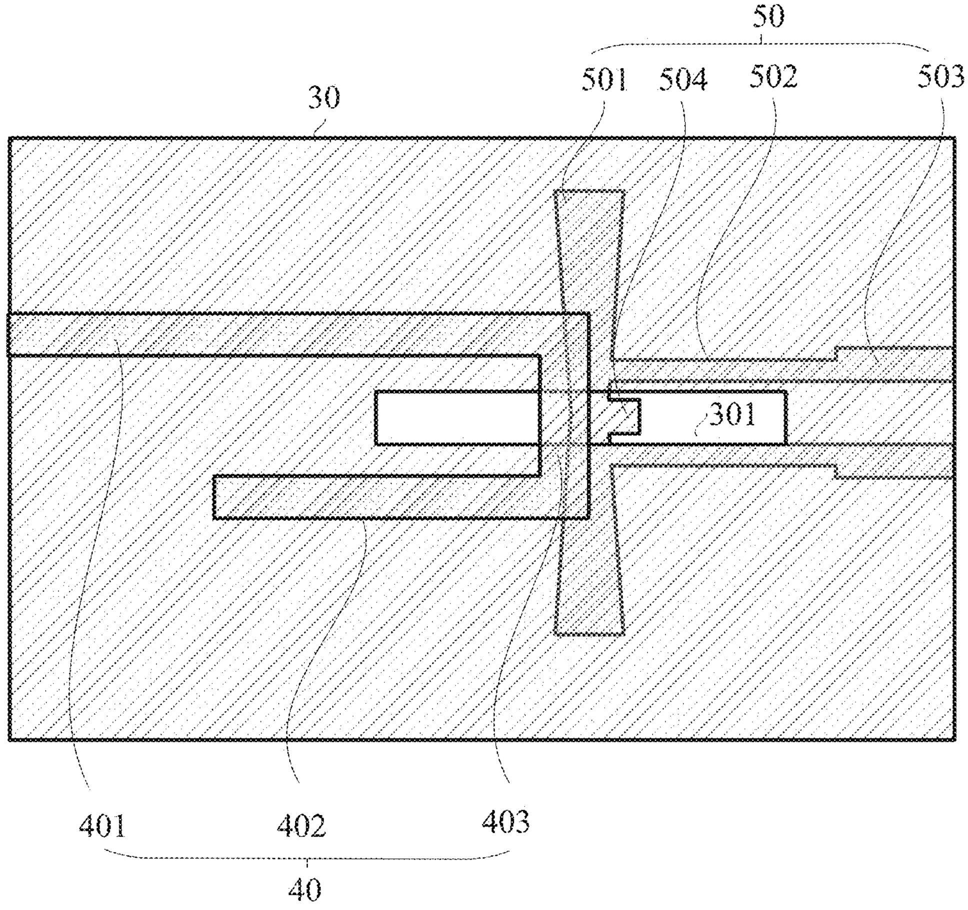
FIG. 7 is a schematic structural diagram of still another balun structure according to some embodiments of the present disclosure.

FIG. 7 is a schematic structural diagram of still another balun structure according to some embodiments of the present disclosure. Referring to FIG. 7, the balance electrode 50 further includes a balance branch 504. The balance branch 504 is disposed between the two impedance matching structures 502 and are connected to the two arms 511 of the antenna structure 501.

The balance branch 504 simultaneously connected to the two arms 511 is disposed between the two impedance matching structures 502. Simulation tests show that this design is conducive to an optimization of a balance of the antenna structure and is capable of improving a matching effect of the impedance matching structure.

Exemplarily, the balance branch 504 is a rectangular branch, and the rectangular balance branch 504 is connected to one end of each of the two arms 511.

A shape of the balance branch 504 herein is only exemplary, and the balance branch 504 may be in other shapes such as elliptical, circular, and the like, which is not limited herein.

Figure 8:
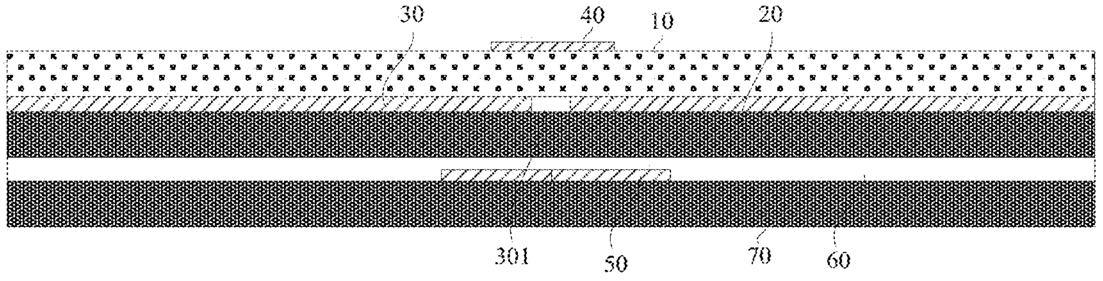
FIG. 8 is a schematic structural diagram of still another balun structure according to some embodiments of the present disclosure.

FIG. 8 is a schematic structural diagram of still another balun structure according to some embodiments of the present disclosure. Referring to FIG. 8, compared with the balun structure illustrated in FIG. 1, the balun structure in FIG. 8 further includes: a third dielectric layer 60 and a fourth dielectric layer 70.

The third dielectric layer 60 is disposed between the second dielectric layer 20 and the fourth dielectric layer 70, and the balance electrode 50 is disposed within the third dielectric layer 60.

Exemplarily, the third dielectric layer 60 is made of air, an adhesive material, a tunable medium, or other dielectric materials, such that an arrangement of the balance electrode 50 in the third dielectric layer 60 is facilitated. In the case that materials such as air are used, the balun structure further requires additional structures to implement positioning and fixation of the second dielectric layer and the fourth dielectric layer.

Exemplarily, the fourth dielectric layer 70 is formed of a single-layer structure or a multi-layer composite structure. For a detailed structure of the fourth dielectric layer 70, reference is made to the above description of the structures of the first dielectric layer 10 and the second dielectric layer 20, which is not repeated herein.

In the case that the two arms of the antenna structure 501 are connected, the balance electrode 50 is integrally arranged. In this case, the entire balance electrode is within a plane. For example, as illustrated in FIG. 8, the balance electrode 50 is within a plane in contact with the fourth dielectric layer 70. In other implementations, the balance electrode 50 is within other planes, such as a plane where the balance electrode 50 is in contact with the second dielectric layer 20.

Figure 9:
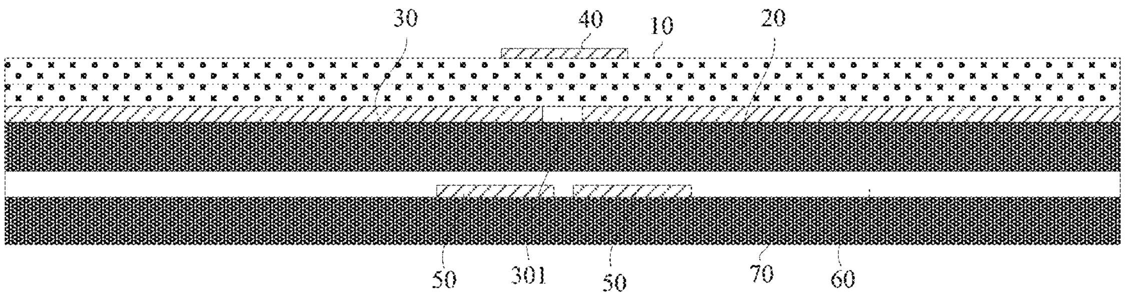
FIG. 9 is a schematic structural diagram of still another balun structure according to some embodiments of the present disclosure.

In the case that the two arms of the antenna structure 501 are separate, the balance electrode 50 includes two separate units. In this case, the two units are within a same plane. For example, as illustrated in FIG. 9, the two units are within a plane in contact with the fourth dielectric layer 70. In other implementations, the two units are within other planes, such as a plane where the two units are in contact with the second dielectric layer 20.

Figure 10:
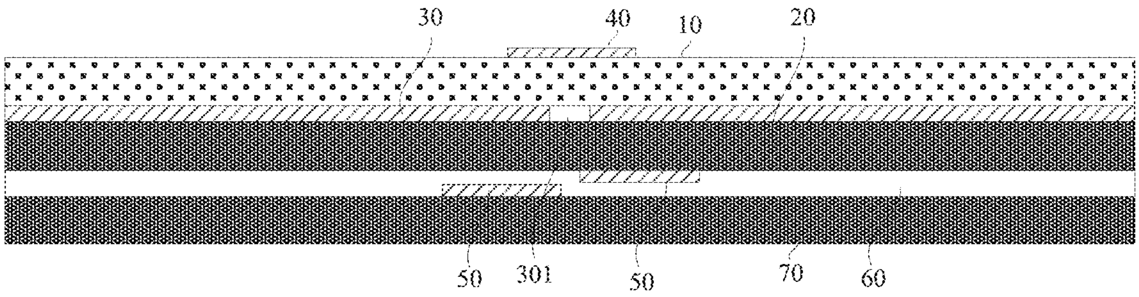
FIG. 10 is a schematic structural diagram of still another balun structure according to some embodiments of the present disclosure.

The two units of the balance electrode 50 are within two different planes. For example, as illustrated in FIG. 10, the two units are respectively in contact with surfaces of the second dielectric layer 20 and the fourth dielectric layer 70.

In the case that the two units of the balance electrode 50 are within different planes, the two transmission electrodes 503 of the balance electrode are disposed in different planes, such that a connected balanced signal transmission line outside the balun structure is disposed in a different layer, and the design is flexible enough to allow the balun structure to match a differential mode/differential transmission device designed to be disposed in different layers with the transmission line.

In the balun structure according to some embodiments of the present disclosure, the transmission portion of the unbalance electrode is a balun unbalance terminal, and is connected to transmission lines such as a coaxial line and a microstrip line for the input/output of the unbalanced signal; and the transmission electrode of the balance electrode is a balun balance terminal, and is connected to microwave devices operating in a differential mode/differential state such as a balance phase shifter and a balance mixer to implement a balanced-unbalanced interconversion.

In the simulation test, the balun structure according to some embodiments of the present disclosure is applied in an unbalance-balance conversion of a signal with a center frequency of 4 GHz. In this case, an output amplitude difference between the two transmission electrodes of the balance electrode is 0.3 dB, a phase difference ranges from 180° to 183°, and an insertion loss is about 0.45 dB. The amplitude difference between signals transmitted by the two transmission electrodes is small, and the phase difference approaches 180. This indicates that the balun structure is capable of well implementing the function of the unbalance-balance conversion.

Some embodiments of the present disclosure further provide an electronic device. The electronic device includes a planar microwave device and a balun structure connected to the planar microwave device. The balun structure is the balun structure as illustrated in any one of FIG. 1 to FIG. 10.

The electronic device may be various display devices, terminal devices, and the like. The planar microwave device may be a differential antenna, a liquid crystal phase shifter, or the like.

In the embodiments of the present disclosure, the unbalance electrode is arranged on the first side of the first dielectric layer, the balance electrode is arranged on the first side of the second dielectric layer, and the ground electrode provided with the coupling hole is arranged between the two dielectric layers. Because the unbalance electrode and the balance electrode are both overlapped with the coupling hole in the direction perpendicular to the first dielectric layer, a signal of one of the unbalance electrode and the balance electrode is coupled to the other electrode via the coupling hole, such that the balanced to unbalanced conversion is implemented. The balun structure is formed of the first dielectric layer, the second dielectric layer, the ground electrode, the unbalance electrode, and the balance electrode, and the balun structure is compact and featured with miniaturization.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A balun structure, comprising: a first dielectric layer, a second dielectric layer, a ground electrode, an unbalance electrode, and a balance electrode; wherein the first dielectric layer, the ground electrode, the second dielectric layer are successively stacked, and the ground electrode has a coupling hole therein, the coupling hole extending from a surface facing the first dielectric layer to a surface facing the second dielectric layer;

the unbalance electrode is disposed on a first side of the first dielectric layer, wherein the first side of the first dielectric layer is a side, distal from the ground electrode, of the first dielectric layer;

the balance electrode is disposed on a first side of the second dielectric layer, and comprises an antenna structure, two impedance matching structures, and two transmission electrodes, wherein the first side of the second dielectric layer is a side, distal from the ground electrode, of the second dielectric layer; the antenna structure is provided with two arms, wherein in the direction perpendicular to the first dielectric layer, one end of each of the two arms is overlapped with the coupling hole, and the other ends of the two arms are respectively disposed on two sides of the coupling hole; the two impedance matching structures are respectively disposed on the two sides of the coupling hole and are respectively connected to the two arms of the antenna structure; the two transmission electrodes are respectively disposed on the two sides of the coupling hole and are respectively connected to the two impedance matching structures; and extension directions of the impedance matching structure and the transmission electrode are parallel to a length direction of the coupling hole; and in a direction perpendicular to the first dielectric layer, the unbalance electrode and the balance electrode are both at least partially overlapped with the coupling hole.

2. The balun structure according to claim 1, wherein the ground structure comprises a first side edge and a second side edge that are opposite to each another;

the unbalance electrode is disposed between the first side edge of the ground electrode and an edge, proximal to the second side edge, of the coupling hole, and the balance electrode is disposed between the second side edge of the ground electrode and an edge, proximal to the first side edge, of the coupling hole; and in the direction perpendicular to the first dielectric layer, a side, proximal to the coupling hole, of the unbalance electrode, a side, proximal to the coupling hole, of the balance electrode, and the coupling hole are at least partially overlapped.

3. The balun structure according to claim 1, wherein the coupling hole is a rectangular hole, an H-shaped hole, or an elliptical hole.

4. The balun structure according to claim 1, wherein the unbalance electrode comprises: a transmission portion, an open circuit portion, and a connection portion; wherein the transmission portion is provided with a first connection terminal distal from the coupling hole and a second connection terminal proximal to the coupling hole, the open circuit portion is parallel to the transmission portion and is provided with an open circuit terminal distal from the coupling hole and a third connection terminal proximal to the coupling hole, and the connection portion is connected to the second connection terminal and the third connection terminal; and in the direction perpendicular to the first dielectric layer, the connection portion is at least partially overlapped with the coupling hole.

5. The balun structure according to claim 4, wherein the connection portion is overlapped with a center of the coupling hole; and a total length of the open circuit portion and the connection portion that are disposed between the open circuit terminal and the center of the coupling hole is ¼ wavelength.

6. The balun structure according to claim 1, wherein a width of each of the arms of the antenna structure progressively increases from one end of the arm to the other end of the arm, or remains constant from one end of the arm to the other end of the arm, or increases and then decreases from one end of the arm to the other end of the arm.

7. The balun structure according to claim 1, wherein each of the arms of the antenna structure has a via hole therein, the via hole extending from the surface facing the second dielectric layer to a surface facing away the second dielectric layer.

8. The balun structure according to claim 1, wherein each of the arms of the antenna structure is fold-line shaped.

9. The balun structure according to claim 1, wherein the balance electrode further comprises: a balance branch;

wherein the balance branch is disposed between the two impedance matching structures and is connected to the two arms of the antenna structure.

10. The balun structure according to claim 1, wherein the two arms of the antenna structure are separated from each other; or the two arms of the antenna structure are connected to each other.

11. The balun structure according to claim 10, further comprising: a third dielectric layer and a fourth dielectric layer;

wherein the third dielectric layer is disposed between the second dielectric layer and the fourth dielectric layer, and the balance electrode is disposed within the third dielectric layer.

12. The balun structure according to claim 11, wherein the balance electrode comprises two units, each of the two units comprising one of the arms, one of the impedance matching structures, and one of the transmission electrodes that are successively connected;

wherein the two units of the balance electrode are within a same plane; or the two units of the balance electrode are within different planes.

13. The balun structure according to claim 11, wherein the balance electrode comprises two units, each of the units comprising one of the arms, one of the impedance matching structures, and one of the transmission electrodes that are successively connected;

wherein the two units of the balance electrode are respectively in contact with surfaces of the second dielectric layer and the fourth dielectric layer.

14. An electronic device, comprising: a planar microwave device and a balun structure connected to the planar microwave device, wherein the balun structure comprises: a first dielectric layer, a second dielectric layer, a ground electrode, an unbalance electrode, and a balance electrode;

wherein the first dielectric layer, the ground electrode, the second dielectric layer are successively stacked, and the ground electrode has a coupling hole therein, the coupling hole extending from a surface facing the first dielectric layer to a surface facing the second dielectric layer;

the unbalance electrode is disposed on a first side of the first dielectric layer, wherein the first side of the first dielectric layer is a side, distal from the ground electrode, of the first dielectric layer;

the balance electrode is disposed on a first side of the second dielectric layer, and comprises an antenna structure, two impedance matching structures, and two transmission electrodes, wherein the first side of the second dielectric layer is a side, distal from the ground electrode, of the second dielectric layer; the antenna structure is provided with two arms, wherein in the direction perpendicular to the first dielectric layer, one end of each of the two arms is overlapped with the coupling hole, and the other ends of the two arms are respectively disposed on two sides of the coupling hole; the two impedance matching structures are respectively disposed on the two sides of the coupling hole and are respectively connected to the two arms of the antenna structure; the two transmission electrodes are respectively disposed on the two sides of the coupling hole and are respectively connected to the two impedance matching structures; and extension directions of the impedance matching structure and the transmission electrode are parallel to a length direction of the coupling hole; and in a direction perpendicular to the first dielectric layer, the unbalance electrode and the balance electrode are both at least partially overlapped with the coupling hole.

15. The electronic device according to claim 14, wherein the ground structure comprises a first side edge and a second side edge that are opposite to each another;

the unbalance electrode is disposed between the first side edge of the ground electrode and an edge, proximal to the second side edge, of the coupling hole, and the balance electrode is disposed between the second side edge of the ground electrode and an edge, proximal to the first side edge, of the coupling hole; and in the direction perpendicular to the first dielectric layer, a side, proximal to the coupling hole, of the unbalance electrode, a side, proximal to the coupling hole, of the balance electrode, and the coupling hole are at least partially overlapped.

16. The electronic device according to claim 14, wherein the coupling hole is a rectangular hole, an H-shaped hole, or an elliptical hole.

17. The electronic device according to claim 14, wherein the unbalance electrode comprises: a transmission portion, an open circuit portion, and a connection portion; wherein the transmission portion is provided with a first connection terminal distal from the coupling hole and a second connection terminal proximal to the coupling hole, the open circuit portion is parallel to the transmission portion and is provided with an open circuit terminal distal from the coupling hole and a third connection terminal proximal to the coupling hole, and the connection portion is connected to the second connection terminal and the third connection terminal; and in the direction perpendicular to the first dielectric layer, the connection portion is at least partially overlapped with the coupling hole.

18. The electronic device according to claim 17, wherein the connection portion is overlapped with a center of the coupling hole; and a total length of the open circuit portion and the connection portion that are disposed between the open circuit terminal and the center of the coupling hole is ¼ wavelength.

* * * * *